COIN CONTROLLED TAPE PLAYER

Filed Feb. 1, 1960 8 Sheets-Sheet 1

INVENTORS
Fred H. Osborne
Christian L. Flateau
Anthony C. Ippolito
By: Olson & Trexler attys.

March 5, 1963 F. H. OSBORNE ETAL 3,080,456

COIN CONTROLLED TAPE PLAYER

Filed Feb. 1, 1960 8 Sheets-Sheet 2

INVENTORS
Fred H. Osborne
Christian L. Flateau
Anthony C. Ippolito
By: Olson & Trexler attys.

INVENTORS
Fred H. Osborne
Christian L. Flateau
Anthony C. Ippolito
By: Olson & Trexler attys.

COIN CONTROLLED TAPE PLAYER

Filed Feb. 1, 1960 8 Sheets-Sheet 4

INVENTORS
Fred H. Osborne
Christian L. Flateau
Anthony C. Ippolito
By: Olson & Trexler attys.

INVENTORS
Fred H. Osborne
Christian L. Flateau
Anthony C. Ippolito
By: Olson & Trexler attys.

COIN CONTROLLED TAPE PLAYER
Filed Feb. 1, 1960 8 Sheets-Sheet 6
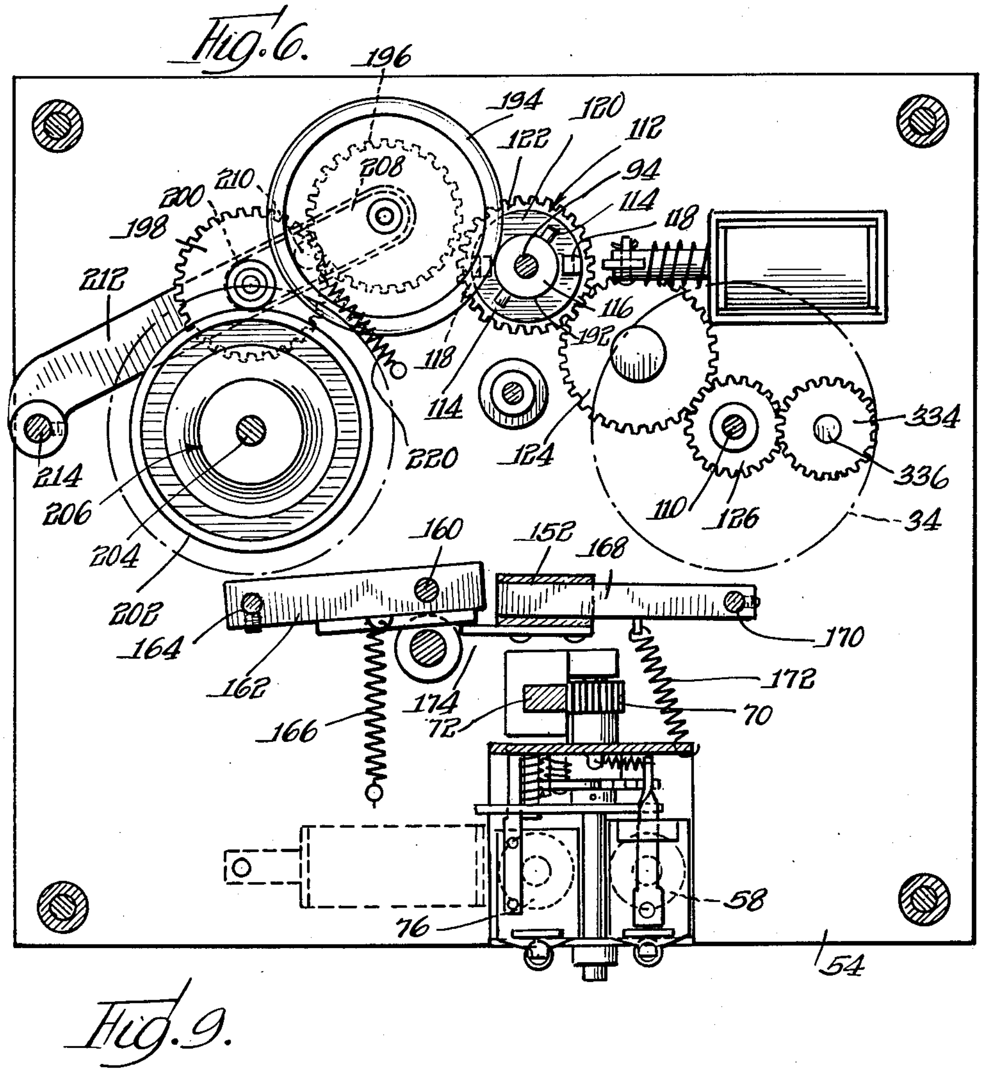
Fig. 9.
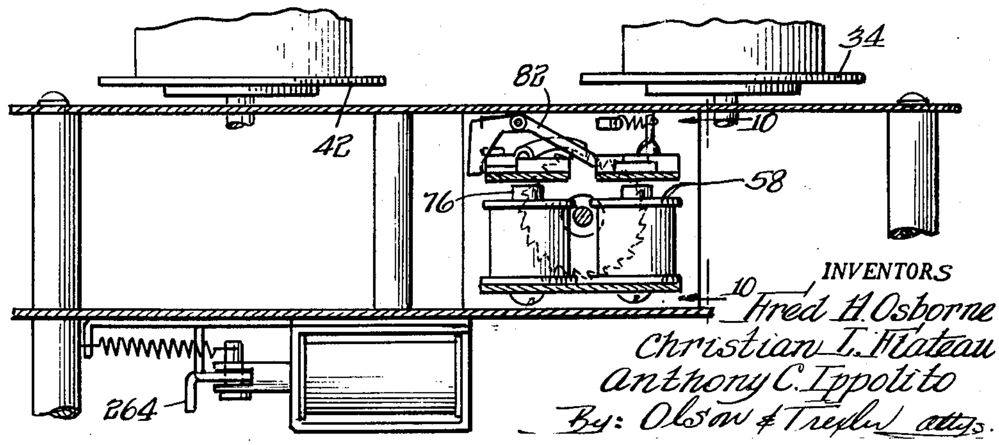
INVENTORS
Fred H. Osborne
Christian T. Flateau
Anthony C. Ippolito
By: Olson & Trexler attys.

COIN CONTROLLED TAPE PLAYER

Filed Feb. 1, 1960 8 Sheets-Sheet 7

Inventor
Fred H. Osborne
Christian L. Flateau
Anthony C. Ippolito
By: Olson & Trexler Att'ys

COIN CONTROLLED TAPE PLAYER

Filed Feb. 1, 1960 8 Sheets-Sheet 8

INVENTORS
Fred H. Osborne
Christian L. Floteau
Anthony C. Ippolito
By: Olson & Trexler Attys United States Patent Office 3,080,456
Patented Mar. 5, 1963

3,080,456
COIN CONTROLLED TAPE PLAYER

Fred H. Osborne, Snyder, and Christian L. Flateau and Anthony C. Ippolito, North Tonawanda, N.Y., assignors to The Wurlitzer Company, Chicago, Ill., a corporation of Ohio
Filed Feb. 1, 1960, Ser. No. 5,818
25 Claims. (Cl. 179—100.2)

The present invention relates to jukeboxes.

One object of the invention is to provide a new and improved jukebox for playing tape recordings.

Another object is to provide a jukebox with an automatic tape deck which has an extremely efficient and inherently reliable mode of operation in playing automatically any desired selection of a plurality of tape recordings.

Another object is to provide an automatic tape deck which will play a large number of tape recordings automatically in any desired order and in rapid succession.

Another object is to provide an improved jukebox tape deck which responds immediately to the completion of the playing of any one of a plurality of tape recordings of different length to rewind the tape to an exact starting position in an exceptionally short interval of time.

A further object is to provide an improved tape deck as recited in the above objects which responds immediately to a very simple pattern of electric control currents to automatically play any desired selection of a plurality of tape recordings.

Another object is to provide an improved jukebox tape deck, as recited, in which tape is automatically moved past a pickup head and automatically returned to its precise starting position upon completion of playing of a tape recording by integrated transmission and control structure energized by a single motor and providing a highly efficient and dependable mode of operation.

Other objects and advantages will appear from the following description of the exemplary embodiment of the invention illustrated in the drawings, in which;

FIG. 6 is a horizontal sectional view looking down from the line 6—6 in FIG. 3;

FIG. 9 is a fragmentary sectional view taken generally along the line 9—9 of FIG. 3;

Figure 1:
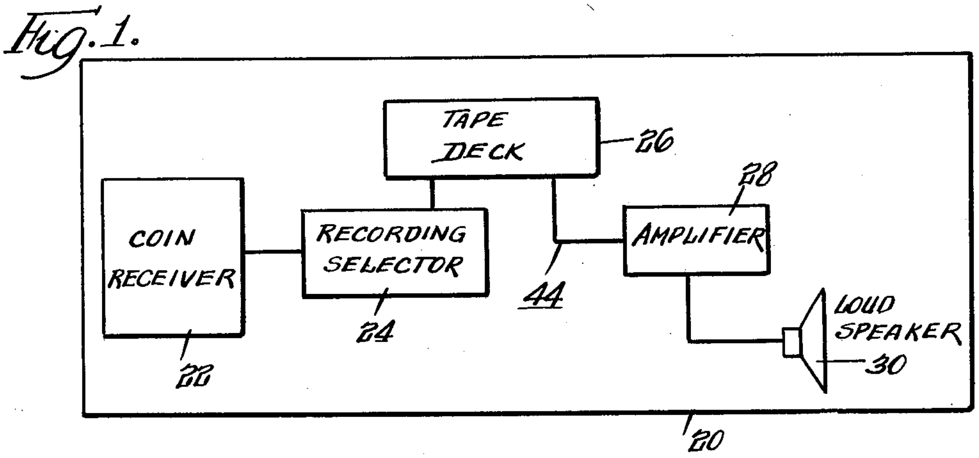
FIGURE 1 is a schematic illustration of a jukebox incorporating the exemplary form of the invention.

Referring to the drawings in greater detail, the exemplary embodiment of the invention is incorporated into a jukebox 20 illustrated schematically in FIG. 1. Many components of the jukebox are of conventional construction, such as can be readily provided by those skilled in the art, and need not be described in detail here. In general, the jukebox comprises a coin receiver 22 that activates a recording selector 24 which controls a tape deck 26 to play the desired tape recordings in accordance with the invention. The electrical output signal of the tape deck 26 excites an amplifier 28 which drives a loudspeaker 30.

Figures 5, 10, 11:
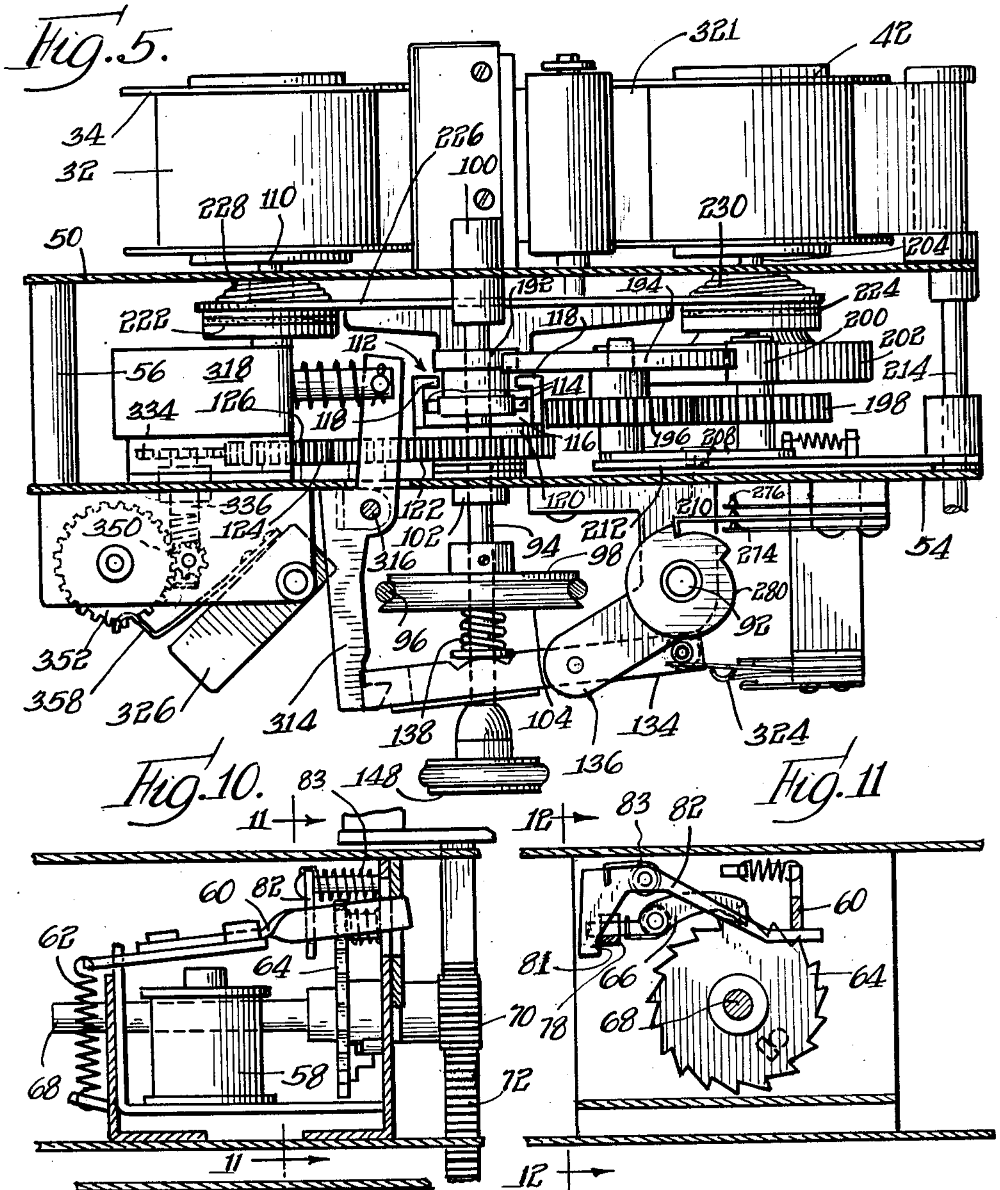
FIG. 5 is a vertical sectional view of the tape deck taken along the line 5—5 of FIG. 3.
FIG. 10 is a fragmentary sectional view taken with reference to the line 10—10 of FIG. 9.
FIG. 11 is a fragmentary sectional view taken along the line 11—11 of FIG. 10.

As will presently appear, the tape deck 26 provided by the invention responds automatically to simple control pulses from the recording selector 24 to play any desired selection of a plurality of recordings on a magnetized prerecorded tape 32, which has a sufficient width, FIG. 5, to accommodate a plurality of independent sound tracks or channels extending along the length of the tape in side by side relation to each other.

In the present instance, the tape 32 has sufficient width to accommodate 20 juxtaposed recording channels, which are pre-recorded with selections to be made available for playing in the jukebox. All the recordings start at the same linear position along the tape. However, not all recordings are of precisely the same length, some of the recordings continuing on beyond others before concluding. The tape has sufficient length extending away from its starting position to accommodate the longest recording. Also, the tape continues at opposite ends beyond the recorded section of the tape to provide two leaders which are used in starting movement of the tape in a playing direction and in rewinding the tape as will presently appear.

Substantially all of that portion of the tape 32, which is recorded with the selections made available for playing, is normally spooled on a rewind reel 34, FIGS. 2, 3, 5 and 8. A lead portion of the tape 32 extends from the rewind reel 34 over a guide stud 36, FIG. 2, alongside a pickup head 38, and around a guide spool 40 onto a takeup reel 42.

The recording pickup 38 itself is of conventional construction and need not be described in detail here. An output lead 44 from the pickup 38, connects with the coacting amplifier 28. The pickup 38 is adapted to be electrically excited by any one of the recording tracks on the tape 32 which is aligned with the pickup as the tape is moved past the pickup as will be described later.

Figure 16:
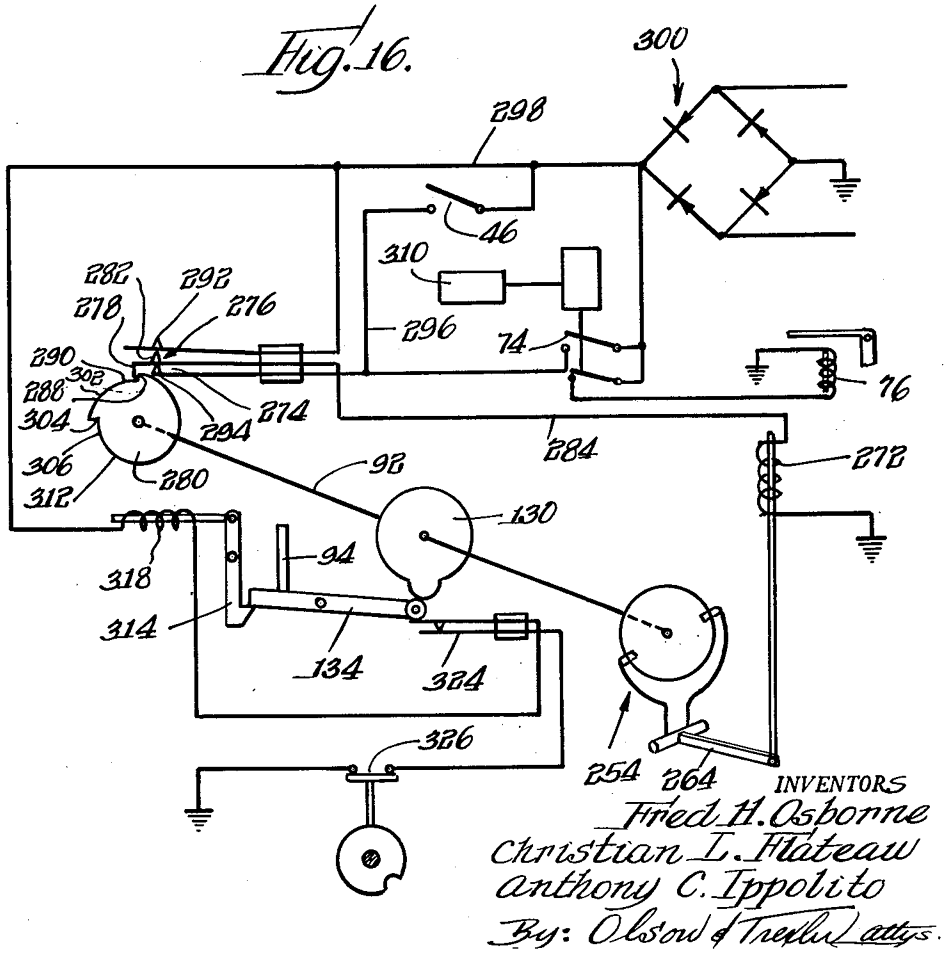
FIG. 16 is a simplified diagrammatic illustration of electrical control circuits used in the tape deck.

After depositing coins in the coin receiver 22 in the usual manner, the customer or patron of the jukebox operates conventional selector controls on the recording selector 24, which produces a number of selector pulses corresponding to the desired recording and effects closing of a switch 46, to FIG. 16, to put the tape deck 26 into operation. A recording selector capable of producing electrical selector pulses corresponding in number to any desired recording can be readily provided by those skilled in the art.

The tape deck 26 responds immediately to the selector pulses from the recording selector 24 and to closing of the start switch 46, as will be described presently in greater detail, to automatically play the desired recording and rapidly return the tape to its exact starting position immediately upon completion of playing of the recording. Thus, the tape deck 26 operates in response to selector pulses to index the pickup 38 laterally with respect to the tape 32 to have a playing alignment with the track or channel on the tape on which the desired recording appears. The tape is automatically brought into playing engagement with the pickup 38 and moved steadily past the pickup at a predetermined uniform playing speed.

As previously intimated, not all recordings are of the same length. All recordings start at the same place along the length of the tape but end at different places along the tape depending upon the length of the individual recordings. As will presently appear, the tape deck automatically responds immediately to completion of the playing of any particular recording regardless of its length to immediately retract the tape onto the rewind reel 34 at a very rapid rewind speed and to stop the tape accurately in its normal starting position in readiness for playing the next recording.

These automatic functions of the tape deck 26 in the playing of a tape are achieved in an extremely efficient and dependable manner through operation of integrated transmission and control structure powered by a single electric motor 48.

The electrical pickup or pickup head 38 normally occupies a stand-by position, adjacent the lower edge of the tape 32, in which the pickup head overlies a horizontal support plate 50 of a frame 52 for the tape deck. As shown, the frame 52 comprises the support plate 50 and a parallel underlying support plate 54, which are mounted in vertically spaced relation to each other by support posts 56.

The pickup head 38 is indexed upwardly from its normal position into alignment with the recording track to be played by a selector solenoid 58, FIGS. 3, 6, 9 and 10, which is energized by electrical selector pulses from the recording selector 24.

Figures 3, 17:
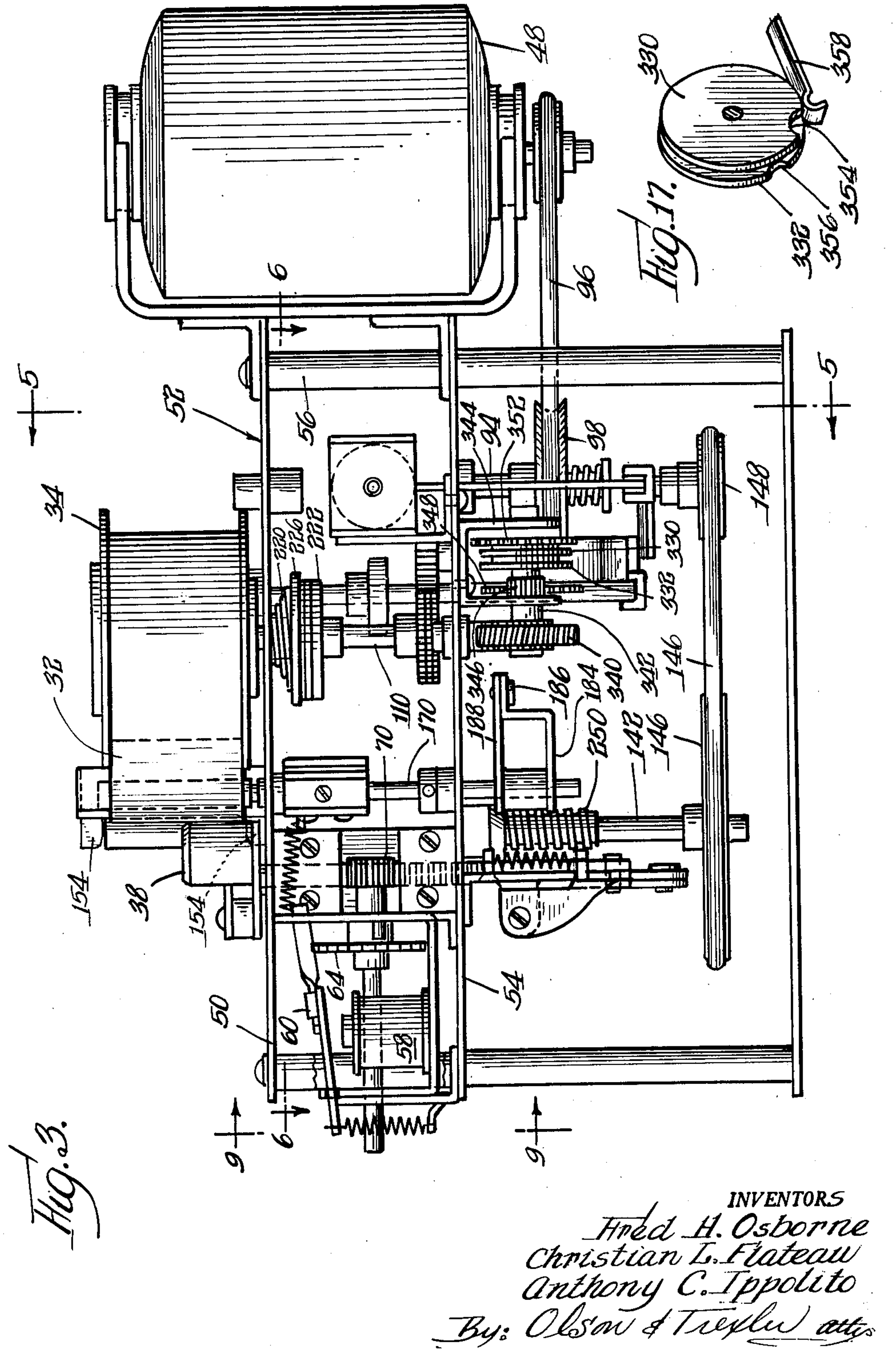
FIG. 3 is an end elevational view of the tape deck taken from the right end of FIG. 2.
FIG. 17 is a fragmentary perspective view of the cam and follower operating structure for the return switch.

Each selector pulse supplied to the selector solenoid 58 momentarily energizes the solenoid to electromagnetically effect a downward swinging movement of a pivoted selector pawl 60 against the action of a return spring 62, FIGS. 3 and 10.

The free end of the selector pawl 60 extends across the serrated periphery of a ratchet wheel 64 and coacts with the ratchet wheel to rotate the ratchet wheel through a predetermined increment of movement corresponding to the lateral spacing of adjacent recording channels on the tape 32, in response to a single stroke on the selector pawl effected by energization of the solenoid 58.

Retrograde or reverse movement of the ratchet wheel 64 is prevented by engagement of a holding pawl 66 with the ratchet wheel as shown in FIG. 11.

Figures 7, 8:
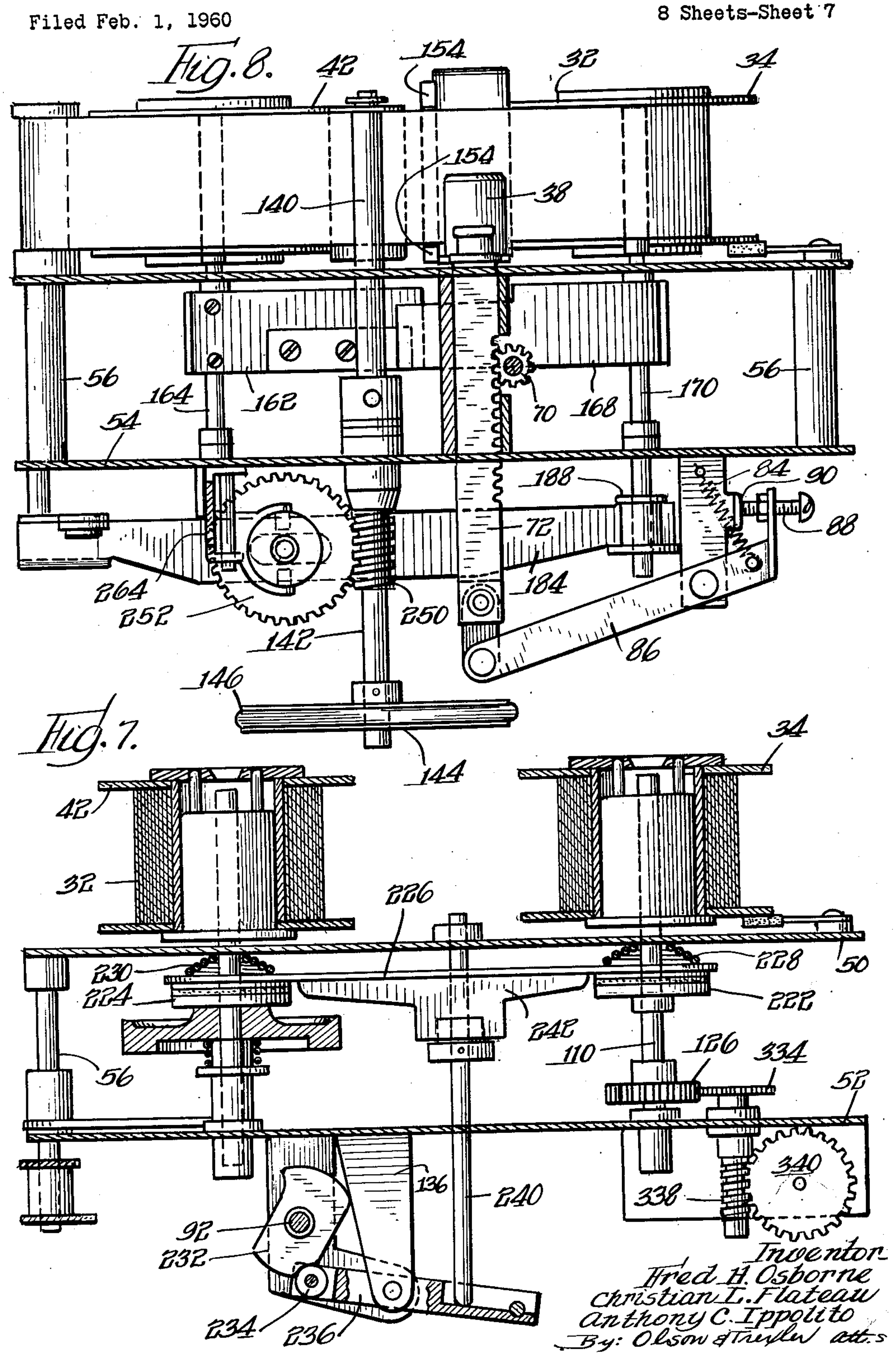
FIG. 7 is a vertical sectional view taken along the line 7—7 of FIG. 2.
FIG. 8 is a vertical sectional view taken along the line 8—8 of FIG. 2.

Rotary indexing movement of the ratchet wheel 64 is transmitted through a mounting shaft 68 for the wheel to a pinion 70 which meshes with a vertical support rack 72, FIGS. 6, 8 and 10, the upper end of which supports the pickup head 38. Hence, rotary movement of the ratchet wheel 64 by the selector solenoid 58 effects a vertical indexing of the pickup head 38 on the upper end of the rack 72 transversely with respect to the tape 32.

Thus, the selector solenoid 58 responds to 10 intermittent selector pulses, for example, from the recording selector 24 to index the recording head 38 upwardly from its normal position to the tenth recording channel above the normal position of the pickup head.

Figure 12:
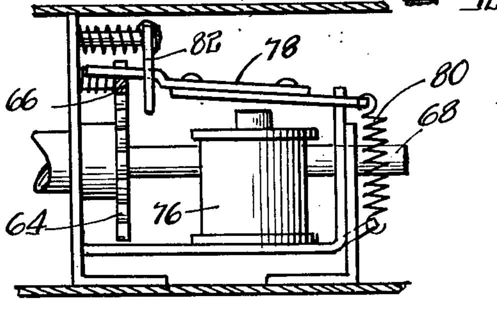
FIG. 12 is a sectional view taken along the line 12—12 of FIG. 11.

At the completion of the playing of the selected recording a switch 74, FIG. 16, is closed to energize a pickup head retracting solenoid 76, FIGS. 6, 9 and 12 to effect an immediate return of the pickup head 38 to its normal position. Energization of the solenoid 76 effects an electromagnetic swinging of a release lever 78, FIGS. 11 and 12, against a spring 80 to engage the ratchet wheel holding pawl 66 and swing the pawl out of engagement with the ratchet wheel 64. The free end of the release lever 78 normally engages one end 81 of a medially pivoted lever 82. Downward movement of the lever 78 disengages this lever from the lever end 81, to enable a spring 83 to swing the lever 82 in a counterclockwise direction. The opposite end of the lever 82 underlies the selector pawl 60 and swings the latter upwardly to assure disengagement of this pawl from the ratchet wheel 64 so that the wheel is free to rotate in its reverse direction. The end 81 of the lever 82 moves over the adjacent end of the lever 78 to latch the lever 78 in its depressed position.

This releases the recording head 38 and its support rack 70 to be moved downwardly by the force of gravity and the reaction of a return spring 84, FIG. 8 on a return lever 86 linked to the lower end of the rack. The pickup head 38 is properly located in its normal position by engagement of an adjustable stop 88 on the lever 86, FIG. 8 with an abutment 90. Subsequent energization of the selector solenoid 58 moves the pawl 60 downwardly against the adjacent end of the lever 82 to swing the latter against the spring 83 to release the lever 78 and holding pawl 66.

Movement of the tape 32 in relation to the pickup head 38 is controlled in an extremely efficient and reliable manner through the agency of a master control cam shaft 92, FIGS. 13 to 15, as will be described later in detail.

Figure 2:
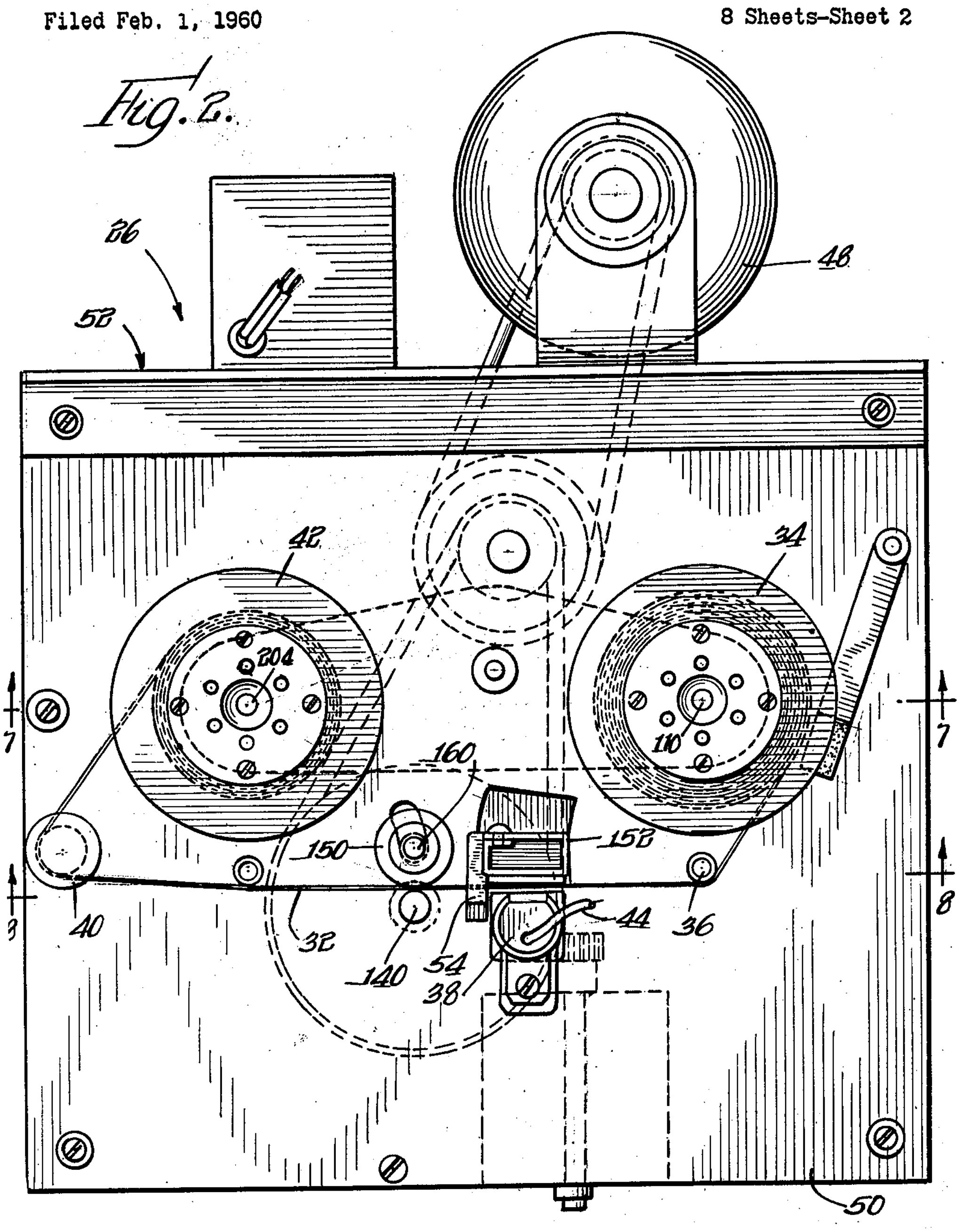
FIG. 2 is a plan view of the tape deck of the jukebox of FIG. 1.

Except for the operation of various control solenoids, the tape deck 26 is fully energized mechanically as previously mentioned by means of the single electric motor 48, which is mounted on one side of the frame 52 as shown in FIGS. 2 and 3.

Figure 4:
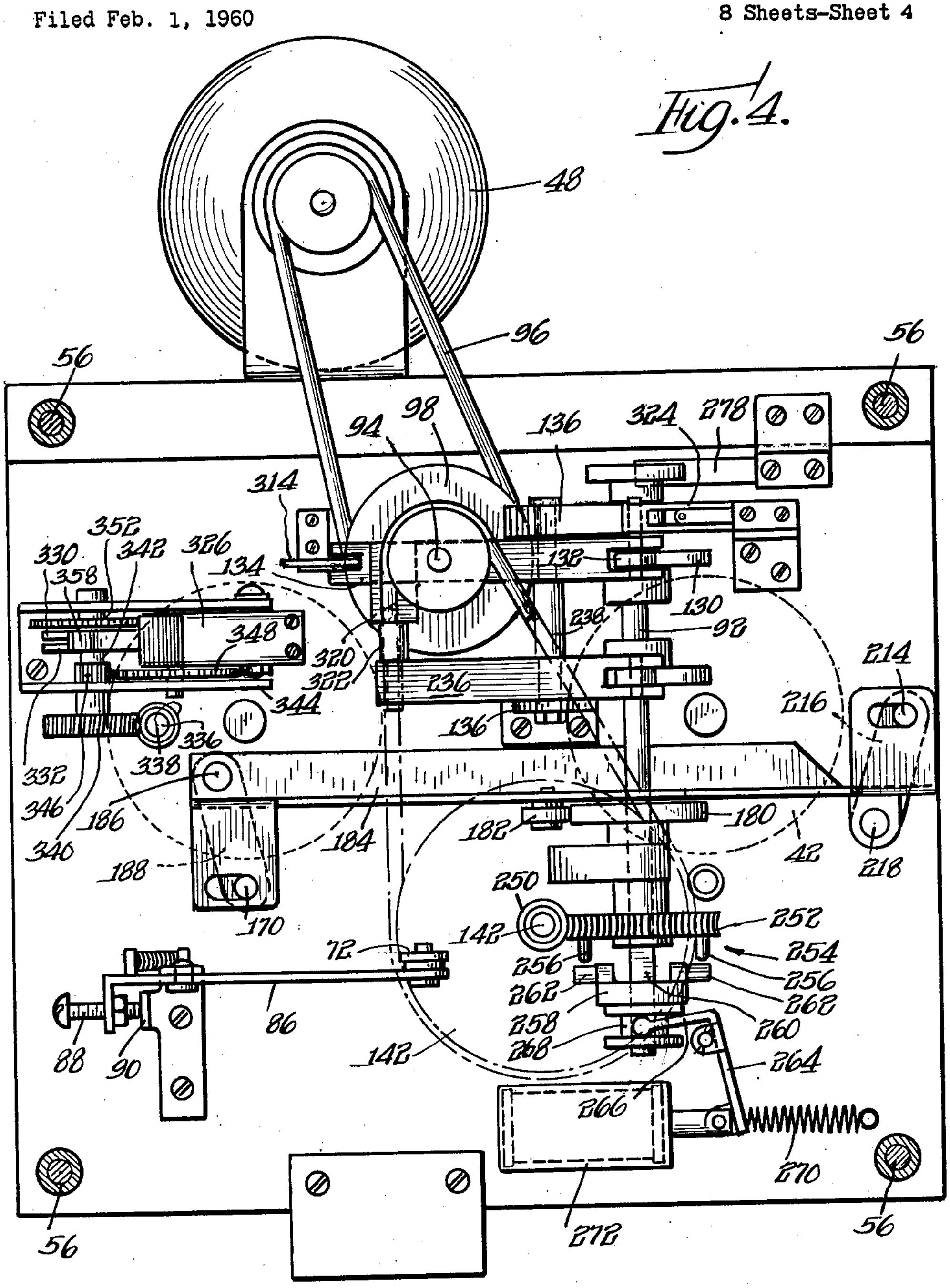
FIG. 4 is a bottom view of the tape deck of FIG. 2.

Power is transmitted for the motor 48 to a main drive shaft 94, FIGS. 3, 4 and 5, through a belt 96 which drives a pulley 98 fixed to the drive shaft.

The main drive shaft 94 is journaled in a vertical position in bearings 100, 102 in the upper and lower support plates 50, 54, which provide for vertical shifting movement of the shaft 94 from a normal position illustrated in FIG. 5 to an elevated tape rewinding position as will be described. It will be noted that the lower flange 104 of the pulley 98, FIG. 5, is radially enlarged to maintain engagement of the belt 96 with the pulley when the pulley is shifted upwardly from its normal position by movement of the shaft 94 away from its normal position.

The tape 32 is wound onto the rewind or storage reel 34 by means of a rewind transmission controlled by the previously mentioned cam shaft 92 and powered from the main drive shaft 94.

The rewind reel 34 is demountably supported on the upper end of a rewind shaft 110, FIGS. 2, 3, 5 and 6, which projects above the support plate 50 and connects nonrotatably with the rewind reel. The shaft 110 is journaled in a vertical position in suitable bearings in both support plates 50 and 54.

The rewind shaft 110 is rotated by power supplied from the main drive shaft 94 through a normally disengaged clutch 112 located above the lower support plate 54 as shown in FIGS. 5 and 6. The clutch 112 comprises two driving lugs 114 projecting radially outward in opposite directions from a collar 116 non-rotatably fixed to the drive shaft 94. When the drive shaft 94 is in its normal position, shown in FIG. 5, the driving lugs 114 are disposed below a pair of driven lugs 118 projecting radially inward from opposite sides of the driven clutch member 120 journaled in encircling relation to the shaft 94 and collar 116.

Upward shifting movement of the shaft 94 from its normal position, FIG. 5, to an elevated tape rewind position brings the driving lugs 114 to interfering relation with the driven lugs 118 to transmit rotary power to the clutch driven member 120. Rotation of the driven clutch member 120 rotates the rewind shaft 110 through a gear 122 fixed to the lower side of the clutch member 120, an idler gear 124, FIG. 6, meshing with the gear 122, and a gear 126 non-rotatably mounted on the shaft 110 and meshing with the idler 124.

Shifting of the drive shaft 94 from its normal position to its raised, tape rewind position is controlled by rotation of the master control cam shaft 92, FIGS. 4, 5 and 13 to 15, which carries a single lobed tape rewind control cam 130. Cam 130 acts against a follower roller 132 on the adjacent end of a rewind control rocker 134 medially pivoted on support brackets 136, FIGS. 4 and 5. The opposite end of the rocker 134 underlies and engages a coiled compression spring 138 encircling the drive shaft 94 between the rocker and the pulley 98.

Figures 13, 14, 15:
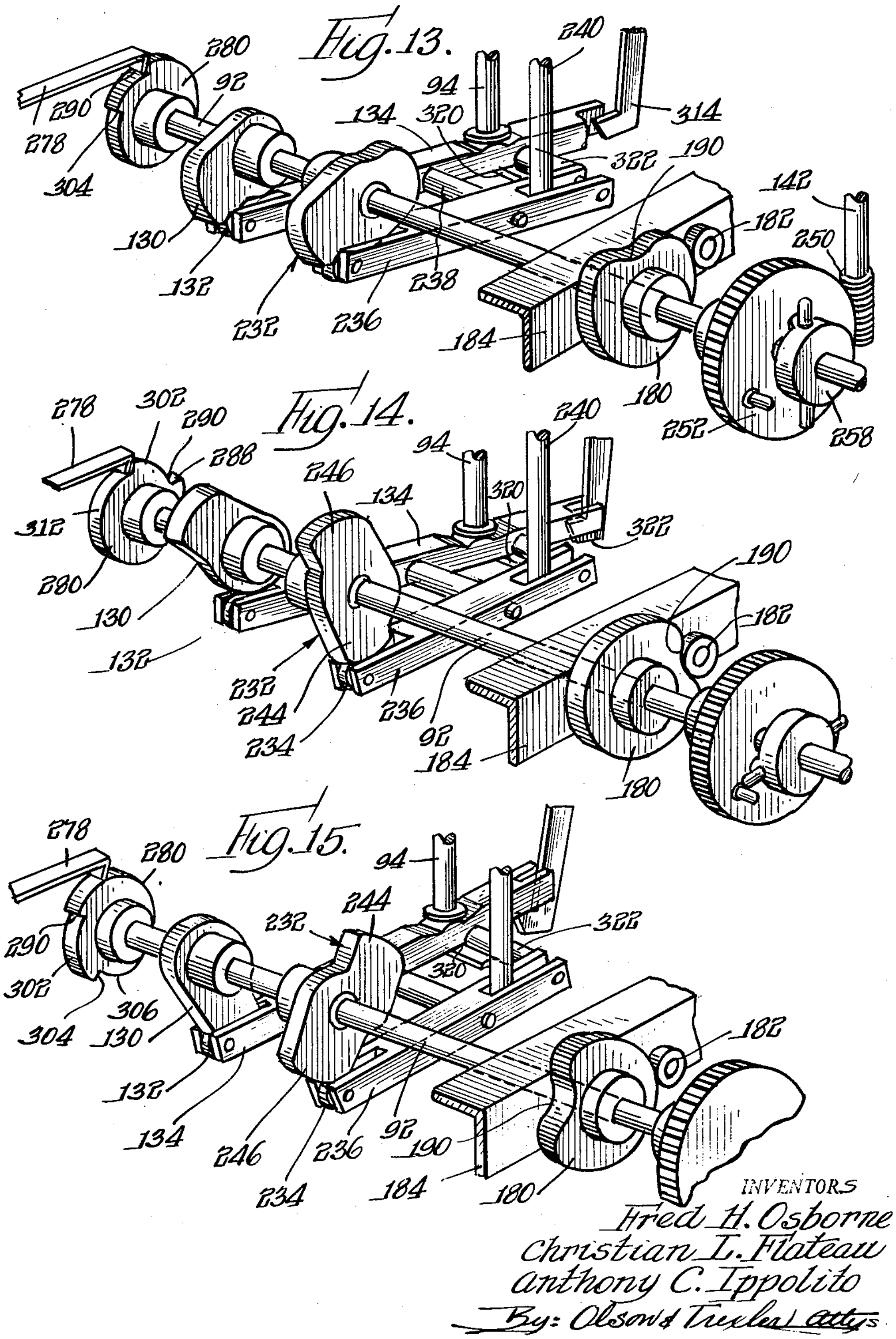
FIG. 13 is a fragmentary perspective view showing the normal positions of the master control cam shaft and coacting control parts.
FIG. 14 is a view similar to FIG. 13 but showing the position of the control cam shaft moved to its tape playing position.
FIG. 15 is a view similar to FIGS. 13 and 14 which illustrates the action of the control cam shaft in initiating a tape rewinding cycle of the tape deck.

Upon rotary movement of the control cam shaft 92 to the position shown in FIG. 15, the rewind cam 130 moves the cam follower 132 downwardly to effect upward movement of the shaft 94 by the spring 138 to engage the clutch 112 and rotate the rewind reel 34 in a direction for spooling tape onto the reel 34.

To play a tape recording, the tape 32 is moved past the pickup head 38 at a uniform playing speed as previously mentioned. This movement of the tape alongside the pickup head is effected by a tape playing drive roller 140, FIGS. 2 and 8, formed on the upper end of a vertical shaft 142 which projects above the upper support plate 50 along the pickup head side of the straight run of tape extending from the guide stud 36 to the guide spool 40. The driving roller 140 is spaced a short distance from the pickup head 38 toward the spool 40 as shown.

The shaft 142 is supported by suitable bearings in the mounting plates 50, 54 and projects below the plate 54, as shown in FIGS. 3 and 8, where the lower end of the shaft supports a pulley 144 connected by a belt 146 to a driving pulley 148 on the lower end of the main drive shaft 94, which projects downwardly below the rewind control rocker 134.

During playing of a tape recording, the tape 32 is held firmly against the driving roller 140 by means of a rubber platen roller 150 which is yieldably urged against the side of the tape opposite from the driving roller.

While being moved across the pickup head 38 to activate the pickup head, the tape 32 is held firmly against the pickup head by means of a backup or supporting head 152 which applies pressure to the side of the tape opposite from the pickup head. A pair of horizontal guides 154 mounted on the support head 152 embrace the upper and lower edges of the tape to insure proper vertical positioning of the tape as it moves past the pickup head.

During rapid rewind of the tape onto the reel 34, the tape is released to run free of frictional engagement with the playing roller 140, platen roller 150, pickup head 38 and backup head 152. For this purpose, the platen roller 150 and backup head 152 are automatically retracted away from the driving roller 140 and pickup head 38 by operation of the cam control shaft 92 at the beginning of the tape rewind phase of the operating cycle.

Thus, having reference to FIGS. 2, 3, 4, 6 and 8, the platen roller 150 is journaled on a stub shaft 160 which projects upwardly from the free end of an arm 162 swingably mounted between the support plates 50, 54 on a pivot shaft 164. A tension spring 166, FIG. 6, connects with the arm 162 and urges the arm in a direction for engaging the platen roller 150 with the tape.

The backup head 152 projects upwardly from the free end of a swingable arm 168 supported at one end between the plates 50, 54 by a vertical operating shaft 170. The arm 168 extends toward the free end of the platen roller support arm 162 as shown in FIG. 6. A spring 172 connected to the arm 168, as shown in FIG. 6, urges the backup head 152 toward the pickup 38.

The backup head 152 is moved away from the pickup head 38 to release the intervening tape 32 by clockwise movement of the arm 168 with reference to FIG. 6 by rotary movement of the shaft 170. An ear 174 mounted on the projecting end of the arm 168 engages the adjacent free end of the arm 162 to effect swinging movement of the latter arm which carries the platen roller 150 away from the driving roller 140 simultaneously with release of the head 152 from pressure engagement with the tape.

Rotary displacement of the arm support shaft 170, FIGS. 6 and 8, is controlled by a cam 180 fixed to the master control shaft 92, as shown in FIGS. 4 and 13 to 15. The shaped periphery of the cam 180 engages a cam following roller 182 carried by a horizontal slide 184 supported for longitudinal translation below the support plate 54. One end of the slide 184 is connected by a pivot 186, FIGS. 3 and 4, to the projecting end of a radial arm 188 fixed nonrotatably to the shaft 170.

The forces of the springs 166, 172 acting on the arms 162, 168, FIG. 6, operate through the linkage described to urge the cam follower 182 toward the center of rotation of the control cam 180.

Normally, the cam 180 holds the coacting follower roller 182 outwardly from the axis of the cam to operate through the slide 184, arm 188, and the shaft 170 and the arms 168 and 162 to hold the backup head 152 and the platen roller 150 away from the tape 32.

However, upon movement of the control cam shaft 92 into its tape playing position illustrated in FIG. 14, a single indentation 190 in the cam 180 is brought into alinement with the follower roller 182, freeing the roller to move inwardly toward the axis of the cam and allowing the springs 166, 172 to move the platen roller 150 and support head 152 into a firm engagement with the tape to hold the tape against the driving roller 140 and against the pickup head 38 for playing.

Rotation of the master cam shaft 92 on beyond its tape playing position moves the follower 182 back to its normal position to release the pressure on the tape moving across the pickup head 38 and driving roller 140.

The movement of the follower roller 182 and slide 184 which controls the pressure engagement of the platen roller 150 and head 152 with the tape is also used to control a driving transmission to the takeup reel 42 to automatically spool onto the reel 42 the tape emerging from between the driving roller 140 and platen roller 150 during the playing of a recording.

The transmission which drives the takeup reel 42 is powered from the main drive shaft 94 through friction drive means comprising, as shown in FIGS. 5 and 6, a small friction drive wheel 192 on the upper end of the collar 116 fixed to the drive shaft 94, a larger friction wheel 194 supported as will presently appear for controlled engagement with the driving wheel 92, a gear 196 fixed to the lower side of the wheel 194 for rotation by the latter, a gear 198 meshing with a gear 196, a small friction drive wheel 200 fixed to the upper end of the gear 198 for rotation by the latter, a larger friction wheel 202 positioned for engagement by the friction wheel 200, a slip coupling 206 and a takeup reel drive shaft 204. The slip coupling 206 is mounted within the hub of the friction wheel 202 and transmits only a limited driving torque to the shaft 204 which is journaled in concentric relation to the wheel 202.

The slip coupling 206, is a simple frictional drive capable of slipping over an indefinite period of time while transmitting a predetermined limited torque to the takeup reel drive shaft 204.

The takeup reel 42 is removably yet nonrotatably mounted on the upper end of the shaft 204 which projects above the support plate 50.

The opposing friction wheels in the transmission which drives the pickup reel 42 are engaged with each other only during the actual playing of a recording. Thus, as shown in FIGS. 5 and 6, the friction wheel 194 and gear 196 are journaled on one end of a rocker lever 208, the other end of which journals the gear 198 and friction wheel 200. The rocker lever 208 is medially pivoted by a pivot 210 to the projecting end of a radial support and control arm 212 fixed to a rotatable transmission control shaft 214, FIGS. 4 and 6, journaled in a vertical position on the support plates 50, 54.

A radial arm 216 nonrotatably fixed to the lower end of the shaft 214, FIG. 4, is connected at its outer end by a pivot 218 to the end of the control slide 184 opposite from the shaft 170. A tension spring 220, FIG. 6, connected with the arm 212 urges the arm in a direction to firmly engage the friction wheels 194 and 200 with the coacting friction wheels 192 and 202.

However, the control cam 180 normally operates through the follower 182, slide 184, and shaft 214 to displace the arm 212 in a counterclockwise direction from the position shown in FIG. 6 to disengage the coacting friction wheels of the takeup transmission. Upon movement of the indentation 190 of the cam 180 into alignment with the follower 182 as described, the spring 220 acts to engage the opposing friction wheels to impart a driving torque to the takeup reel shaft 204 to urge the takeup reel 42 in a tape spooling direction to take up tape issuing from the driving roller 140 as described.

Normally, both the takeup reel 42 and the rewind reel 34 are firmly held against rotation by braking means which is operated by the control cam shaft 92 to release both reels simultaneously for rotation at the beginning of either the tape playing phase or the tape rewind phase of the operating cycle and to simultaneously stop rotation of both reels at the end of each tape playing operation and each tape rewind operation.

As shown in FIGS. 3 and 5, two annular breaking discs 222, 224 are nonrotatably mounted on the respective reel shafts 110 and 204 in encircling relation to the shafts to define annular friction surfaces facing upwardly toward the overlying support plate 50.

The break discs 222, 224 are opposed by opposite ends of a horizontally elongated brake member 226, which is apertured to receive the respective reel shafts 110 and 204. The two ends of the brake member 226 are urged downwardly toward braking engagement with the underlying discs 222, 224 by two coiled compression springs 228, 230 encircling the respective shafts 110, 204 between the brake member and the overlying plate 50.

Engagement of the brake element 226 with the discs 222, 224 is controlled by a double lobed cam 232 on the the master cam control shaft 92, FIGS. 7 and 13 to 15. The periphery of the cam 232 is engaged by a cam following roller 234 on one end of a brake control rocker 236 medially pivoted on a pivotable element 238, supported on the brackets 136 and also serving as the pivotable support for the previously mentioned rewind control rocker 134.

The opposite end of the brake control rocker 236 underlies the lower end of a vertical brake release stem 240, which connects through an enlarged head 242 at its upper end with the brake member 226.

Rotation of the master control cam shaft 92 from its normal starting position, FIG. 13, to its tape playing position, FIG. 14, engages the playing lobe 244 of the cam 232 with the follower 234 to swing the rocker 236 in a direction which lifts the brake member 226 clear of the brake discs 222, 224 to release both of the reels 34 and 42 for rotation.

Rotation of the control shaft 92 from the tape playing position illustrated in FIG. 14 toward the tape rewind position shown in FIG. 15, moves the cam lobe 244 out of engagement with the follower 234 allowing the springs 228, 230 to reengage the brake member 226 with the discs 222, 224 to stop rotation of both reels 34 and 42.

Continued movement of the cam shaft 92 on to the tape rewind position, illustrated in FIG. 15, brings a rewind lobe 246 of the cam 232 into engagement with the follower 234 to again release the reel brakes for rewinding the tape as will presently appear.

The master control shaft 92 is rotated in a clockwise direction with reference to FIGS. 13 to 15 by power supplied from the shaft 142, which is continuously driven from the main drive shaft 94. A worm 250 on the shaft 142 meshes with a worm gear 252, FIGS. 8 and 13, journaled for rotation on one end of the cam shaft 92.

Rotary movement of the wheel 252 is transmitted to the cam shaft 92 through a normally disengaged solenoid controlled dog clutch 254 illustrated in FIG. 4. Structurally, the clutch 254 comprises a pair of driving pins 256 projecting axially from one face of the gear 252 toward a driven collar 258 having a nonrotatable yet axially slidable connection with a squared section 260 of the cam shaft 92.

A driving connection through the clutch 254 is established by engagement of the driving pins 256 with a pair of diametrically opposed radial lugs 262 on the collar 258. The driven collar 258 is moved axially on the shaft section 260 to engage and disengage the clutch by a medially pivoted bell crank operator 264 having a yoke 266 which fits into an annular groove 268 in the collar. A tension spring 270 connected to the opposite end of the operating crank 264 urges the driven clutch element 258 toward its disengaged position. Engagement of the clutch 254 is affected by energization of a clutch solenoid 272 connected with the bell crank operator 264 as shown in FIG. 4.

The clutch control solenoid 272 is controlled through the agency of a normally closed switch 274 and a normally open switch 176, FIG. 16, which are operated by a cam follower 278 in the form of a leaf spring which coacts with a switch control cam 280 fixed to the end of the cam shaft 92 opposite from the clutch 254, as shown in FIGS. 4 and 13 to 15.

The cam 280 is formed of an electrical insulating material. The cam follower 278 carries a contact 282, FIG. 16, and is connected through an electrical lead 284 with one side of the clutch solenoid 272, the other side of which is grounded as shown.

Rotation of the cam shaft 92 into its home position, illustrated in FIGS. 13 and 16, allows the cam follower 278 to pass over an abrupt ledge 288 on the cam 280 and move radially inward into a cam recess 290. This moves the contact 282 on the follower 278 out of engagement with a contact 292, to open the switch 276, and into engagement with a contact 294 to close the switch 274. Opening of the switch 276 deenergizes the clutch solenoid 272 to terminate rotation of the cam shaft in its home position as will presently appear.

The input contact 294 of the switch 274 connects, as shown in FIG. 16, with a conductor 296 and the input conductor 292 of the switch 276 connects with a power conductor 298 extending from a grounded rectifier 300.

As previously mentioned, the customer deposits a coin in the coin receiver 22 and operates the recording selector 24 to select the desired recording for playing. This closes the switch 46 as stated. The switch 46 connects the conductor 296 with the power lead 298.

Hence, closure of the switch 46 establishes a circuit through closed switch 274 to energize the clutch solenoid 274 to effect rotation of the cam shaft 92 in a clockwise direction, FIGS. 13 to 16, away from its normal position, FIG. 13. This causes the switch operating cam follower 278 to move along a rising cam surface 302 of the switch cam 280. The contacts 292 and 294 are mounted on resilient supports in a manner such that movement of the cam follower 278 along the rising cam surface 302 closes the switch 276 to complete a circuit from the power lead 298 through the clutch solenoid 272, which bypasses the switch 46. Continued movement of the follower 278 along the surface 302 opens the switch 274.

Rotation of the control cam shaft 92 through an angle of approximately 90 degrees from its home position causes the switch operating cam follower 278 to drop over a second ledge 304 down into a second recess 306 in the cam 280. This opens the switch 276 to deenergize the clutch solenoid 272 and stop rotation of the cam shaft. The switch 46 used to initially energize the clutch solenoid is then open.

The movement of the cam shaft 92 through approximately one-quarter turn in this manner causes the lobe 244 of the brake release cam 232 to operate against the follower 234 as shown in FIG. 14 to release both reels 34 and 42 for rotation. At the same time the indentation 190 on the tape playing cam 180 is brought into alignment with the follower 182 to automatically activate the previously described takeup transmission, which drives the takeup reel 42 in a tape spooling direction. The follower 182 also advances both the platen roller 150 and the backup head 152 against the tape 32 to hold the latter in firm engagement with the driving roller 140 and pickup head 38.

This initiates the playing of the desired recording which is selected by the lateral indexing of the pickup head 38 with respect to the tape in response to the selector pulses supplied to the selector solenoid 58 as described.

The tape playing operation is terminated and a tape rewinding operation is started immediately upon completion of playing of the recording in alignment with the pickup head 38. For this purpose a triggering frequency is recorded on each recording track or channel of the tape 32 at the end of the normal recording in the channel. The triggering frequency is outside the audible range and activates a frequency responsive control 310 to close the relay switch 74 to connect the power lead 298 to the conductor 296. This energizes the clutch solenoid 272, since the switch 274 is closed. A control which will respond to the recorded triggering frequency to operate the relay switch 74 can be readily provided by those skilled in the art and need not be described in detail here.

Energization of the clutch solenoid 272 starts rotation of the cam control shaft 92 which causes the switch operating cam follower 278 to be cammed outwardly by a rising cam surface 312 on the cam 280 to close the switch 276 and maintain energization of the clutch solenoid 272 independently of the switch 74 until the cam shaft 292 reaches its home position, whereupon the follower 278 drops over the ledge 288 to deenergize the clutch solenoid and stop rotation of the cam shaft as recited.

The first effect of rotation of the cam shaft 92 from its tape playing position, FIG. 14, on toward its home position is to disengage the brake release cam lobe 244 from the follower 234 to apply the brakes to both reels 34 and 42. This is followed immediately by movement of the recess 190 on the cam 180 out of alignment with the follower 182, which is forced outwardly to disable the take-up transmission which drives the reel 42 and to release the platen roller 150 and backup head 152 from the tape as recited.

The application of the brakes to both reels 34 and 42 before the limited torque transmitting drive to the take-up reel 42 is disabled assures proper stopping of both reels without backlash or troublesome slack being introduced into the tape.

Continued rotation of the shaft 92 brings the second lobe 246 of the brake release cam 232 into engagement with the follower 234 to release the brakes on both reels for a rewind operation. This is followed immediately by operation of the single lobe rewind cam 130 against the follower 132 to move the main drive shaft 94 upwardly to engage the clutch 112 to rotate the rewind reel 32 in a tape spooling direction as described.

As the shaft 92 continues to rotate on to its home position as described, the brake release cam 232 and rewind cam 130 are carried on to their home positions, FIG. 13, in which the operating lobes of the cams are disengaged from the respective cam followers 234 and 132.

The cam shaft 92 reaches its home position before the rewind operation is completed. However, the reel brakes are held in released position and energization of the rewind transmission is continued by means which provides for the deenergization of the rewind transmission and precise stopping of the reels when the tape has been rewound to its exact starting position.

Thus, with reference to FIG. 5, the rewind control rocker 134 is swung in the clockwise direction to activate the rewind transmission. This brings the end of the rocker 134 opposite from the cam 130 into alignment with the lower end of a generally vertical latch or detent lever 314, which is operated to engage the rocker 134 and hold the latter against return movement to its normal position. The latch lever 314 is supported on a medial pivot 316 and connected at its upper end with an actuating solenoid 318. Energization of the solenoid 318 holds the lower end of the lever 314 in engagement with the rocker 134 to continue engagement of the clutch 112 after the cam 130 is disengaged from the cam follower 132.

A plate 320 fixed to the latch lever end of the rocker 134 projects laterally into underlying relation to a lateral stud 322 on the adjacent end of the brake release lever 236 as shown in FIG. 4, to continue engagement of the reel brakes until the rocker 134 is released from the latch lever 314.

As indicated in FIG. 16 the latch solenoid 318 is energized through a circuit which includes the power lead 298, the latch solenoid 318, a normally open switch 324, and a normally open rewind switch 326, which is connected to ground as shown. The switch 324 is mounted in association with the cam end of the rewind control rocker 134, as shown in FIGS. 4 and 5, to be closed upon movement of the rocker 134 to engage the rewind clutch 112.

The rewind switch 326 is open only when the tape is rewound to its normal starting position. It closes immediately upon movement of the tape away from its starting position at the beginning of a tape playing operation and does not close again until the tape returns to its rewound position. Operation of this switch will be described presently in greater detail.

Upon opening of the switch 326 as the tape 32 reaches its rewound position, the latch solenoid 318 is deenergized to release the latch 314 and allow the brake springs 228 and 230 to immediately set the reel brakes and move the main shaft 94 downwardly to disengage the clutch 112 to virtually instantaneously terminate the rewind phase of the operating cycle.

Operation of the rewind switch 326 is controlled by the conjoint action of a relatively slow motion cam 330, FIGS. 4 and 17 and a relatively high speed cam 332, both of which are driven by the operating shaft 110 for the rewind reel 34. Thus as shown in FIGS. 3, 4, 5 and 6, the rewind reel shaft 110 is connected to operate the switch 326 through the previously mentioned gear 126 on the shaft 110, a gear 334 meshing with the gear 126, a shaft 336 extending downwardly from the gear 334, a worm 338 on the lower end of the shaft 336 and a worm gear 340 meshing with the worm 338. The worm gear 340 is mounted on one end of a shaft 342, FIG. 4, journaled in a support bracket 344 and connected to directly support and rotate the relatively high speed switch control cam 332.

The slow speed cam 330 is driven at a much slower speed through a pinion 346 rotated by the shaft 342, FIGS. 3 and 4, a relatively large gear 348 meshing with the pinion 346, a small pinion 350, FIG. 5, connected for rotation with the gear 348, and a larger gear 352 meshing with the pinion 350 and journaled on the shaft 342 to drive the cam 330, which is also journaled on the shaft 342 and connected directly to the gear 352.

The peripheries of the two cams 330, 332 define circular cam surfaces which are interrupted by a single recess 354 in the cam 330 and a single recess 356 in the cam 332.

When the tape 32 is in its normal starting position both the cam recesses 354 and 356 register with a cam follower 358, allowing the cam follower to move inwardly toward the axes of the cams. The follower 358 spans both cams 330 and 332 as shown in FIG. 17 and operates the switch 326 in a manner such that the switch is open only when both cam recesses are brought into alignment with the cam follower allowing it to move inwardly as recited.

Rotation of the rewind reel 34 as an incident to starting playing of the tape causes rotation of the two cams 330 and 332 to produce an outward displacement of the follower 358 to close the switch 326. The speed reduction in the drive to the slow speed cam 330 is such that the slow speed cam is rotated through an angle substantially less than a complete revolution as an incident to the playing of the longest recording on the tape. Hence, the cam recess 354 is not brought back into alignment with the cam follower 358 in the course of playing the tape.

Upon initiation of a tape rewind phase of the operating cycle, the cam 330 starts rotating in the opposite direction and approaches its starting position at a very slow rate of speed.

A very precise control of the cam follower 358 to deenergize the latch solenoid 318 when the tape reaches its exact starting position is effected by the cam 332 which moves at a much higher speed than the cam 330. Thus even after the recess 354 of the slow cam 330 has progressed into alignment with the cam follower 358, the follower does not move inwardly until the recess 356 of the faster moving cam, comes into alignment with the follower.

The faster speed of the cam 332, which turns through many revolutions in the course of an operating cycle, effects an opening of the switch 326 when both the cam recesses move into simultaneous alignment with the cam follower 358, which occurs at the instant when the tape 32 returns to its starting position.

This opening of the switch 326 in precise synchronism with return of the tape to its starting position regardless of the length of the tape which was removed from and returned to the rewind reel 34 provides for a precise termination of the rewind operation as previously described.

It will be appreciated that the invention is not necessarily limited to the particular construction of the illustrated embodiment but includes variants and alternatives within the spirit and scope of the invention as defined by the claims.

The invention is claimed as follows:

1. For use in playing a multiple channel tape, a tape deck comprising, in combination, a pickup, means for positioning tape in a path extending alongside said pickup for playing, normally inactive tape driving means for moving tape through said path past said pickup for playing, said pickup having a predetermined normal position, electrical pulse responsive means coacting with said pickup for indexing the latter from said normal position thereof laterally with respect to said path for alinement with selected recording channels of tape disposed in said path, a normally inactive tape take-up drive for winding tape moved past said pickup, a high speed tape rewind drive for respooling tape previously moved past said pickup for playing, brake means coacting with both said take-up drive and said rewind drive to normally hold both said drives against movement; and control means coacting with said brake means, said tape driving means, said take-up drive and said rewind drive to effect operation thereof in coordinated relation to each other to move tape past said pickup for playing and to effect high speed respooling of tape subsequent to playing movement of the tape past said pickup.

2. For playing a multiple channel recorded tape automatically in a jukebox, an automatic tape deck comprising, in combination, a rewind reel for tape, a tape take-up reel, a pickup, means for driving tape between said reels through a path extending alongside said pickup, solenoid operated ratchet means coacting with said pickup to index the latter laterally with respect to said path from a normal position to align the pickup with selected channels of a tape in said path, solenoid operated release means coacting with said pickup to release the latter for return to its normal position, a rotary tape driving element disposed alongside said path for moving tape past said pickup, movable pressure applying means for selectively applying pressure to tape in said path to hold the tape against said driving element and against said pickup, a normally inactive transmission for driving said take-up reel, a normally inactive transmission for driving said rewind reel, normally applied brake means for holding said reels against rotation, a cam shaft, drive means for said cam shaft, electrically operated clutch means coacting with said shaft drive means to effect controlled movement of said shaft; and cam means on said shaft coacting with said pressure applying means, said brake means, said take-up reel transmission, and said rewind reel transmission to effect operation thereof in coordinated relation to each other to effect movement of tape from said rewind reel to said take-up reel past said pickup in playing relation thereto and to effect respooling of tape onto said rewind reel.

3. For use in playing a multiple channel tape, an automatic tape deck comprising, in combination, a pickup, a rewind reel, a take-up reel, means for directing along a path extending past said pickup tape wound at opposite ends on said rewind reel and said take-up reel and having a plurality of sound channels, electrical pulse responsive means for indexing said pickup laterally with respect to said path to occupy any one of a plurality of different lateral positions with respect to tape extending through said path for alinement with a corresponding sound channel of the tape, brake means coacting with both said reels to normally hold the latter against rotation, normally inactive tape driving means for moving tape through said path past said pickup, a normally inactive low speed take-up reel transmission for driving said take-up reel to wind up tape moved past said pickup by said driving means for playing, a normally inactive high speed rewind reel transmisison for driving said rewind reel to effect a high speed respooling of tape after playing thereof; and control cam means coacting with said brake means, said tape driving means, said take-up reel transmission, and said rewind reel transmission to effect operation thereof in coordinated relation to each other to move tape from said rewind reel to said pickup reel past said pickup for playing and to effect high speed respooling of tape back onto said rewind reel after playing.

4. For playing a multiple channel recorded tape automatically in a jukebox or the like, a tape deck comprising, in combination, a take-up reel for tape, a rewind reel for tape, a pickup, means for guiding tape between said reels through a path extending past said pickup, a transmission for driving said take-up reel, a transmission for driving said rewind reel, a brake coacting with said rewind reel, means for releasing said rewind reel brake and operating said take-up reel drive to move tape through said path from said rewind reel onto said take-up reel, a rewind termination switch, first and second operators for said rewind switch, operating means for said switch coacting with both said switch operators to effect a tape rewind terminating action of said switch only when both said operators are in normal starting positions thereof, first transmission means interconnecting said rewind reel with said first switch operator to effect a relatively low degree of displacement thereof upon rotation of said rewind reel, second transmission means connecting said take-up reel with said second switch operator to effect a relatively high degree of displacement thereof upon rotation of the take-up reel, said first and second transmission means being constructed to displace said first and second switch operators in directions having senses respectively which correspond to the direction of rotation of said rewind reel, means for releasing said rewind reel brake and operating said rewind reel transmission to respool tape onto said rewind reel after playing of the tape by movement thereof past said pickup, and means operated by said rewind termination switch for terminating rotation of said rewind reel by said transmission therefor and for reapplying said rewind reel brake.

5. For playing a prerecorded tape in a jukebox or the like, an automatic tape deck comprising, in combination, a tape take-up reel drive, a tape rewind reel drive, a pickup, means for guiding tape past said pickup, clutch means for operating said rewind reel drive, normally engaged brake means coacting with said rewind reel drive to hold the latter against movement, rewind reel drive control means including means for engaging said clutch thereof and means for releasing said brake means for the rewind reel drive, solenoid holding means coacting with said rewind reel drive clutch and with said brake means to hold said clutch in engaged condition and to hold said brake means in released condition only so long as said solenoid holding means is energized, means for energizing said solenoid holding means as an incident to engagement of said clutch means, a tape rewind stopping switch connected to control energization of said solenoid holding means, first and second switch control elements, first transmission means connecting said first switch control element with said rewind reel drive to effect upon movement of said rewind reel drive a relatively low degree of displacement of said first control element in a direction having a sense coresponding to the direction of movement of the rewind reel drive, second transmission means connecting said rewind reel drive to said second switch control element to effect upon movement of the rewind reel drive a relatively high degree of displacement of the latter in a direction having a sense corresponding to the direction of movement of the rewind reel drive, and means coacting with both said switch control elements to effect operation of said rewind stopping switch to deenergize said solenoid holding means upon return of both said switch control elements to normal positions thereof corresponding to the starting position of said rewind reel drive.

6. For playing a multiple channel tape in a jukebox or the like, an automatic tape deck comprising, in combination, a rotary control shaft, drive means including a solenoid control clutch for rotating said control shaft; said control shaft having a normal position, a tape playing position, and a tape rewind position; a switch operating cam on said shaft, shaft stopping switch means coacting with said switch cam and with said solenoid clutch to automatically stop movement of said shaft in said normal position and in said tape playing position thereof, a pickup, normally inactive tape moving means for moving tape past said pickup for playing, a take-up reel drive, a tape playing switch coacting with said solenoid clutch to effect movement of said shaft to said tape playing position, cam means on said shaft coacting with said tape moving means and with said take-up reel drive to effect operation thereof upon movement of said shaft to said tape playing position, a frequency responsive control coacting with said pickup and said solenoid clutch to effect movement of said shaft through said rewind position thereof to said normal position thereof upon sensing of a predetermined recorded frequency by said pickup, a tape rewind reel drive having a normal starting condition, cam means on said shaft coacting with said tape rewind reel drive to put the latter into operation upon movement of said cam shaft to said rewind position thereof, brake means coacting with said take-up reel drive and with said rewind reel drive to normally restrain said drives against movement, cam means on said shaft coacting with said brake means to release the latter upon movement of said shaft to either said tape playing position or said tape rewind position thereof, tape rewind continuing means coacting with said brake means and with said rewind drive to continue release of said brake means and operation of said rewind drive after movement of said shaft through said rewind position thereof to said normal position thereof, and tape rewind stopping means operated by said tape rewind drive and coacting with said rewind continuing means to terminate operation of said rewind drive and effect reapplication of said brake means automatically upon return of said rewind drive to its normal starting condition.

7. For playing a multiple channel tape in a jukebox or the like, an automatic tape deck comprising, in combination, a rotary control shaft, drive means including a solenoid control clutch for rotating said control shaft; said control shaft having a normal position, a tape playing position, and a tape rewind position; a switch operating cam on said shaft, shaft stopping switch means coacting with said switch cam and with said solenoid clutch to automatically stop movement of said shaft in said normal position and in said tape playing position thereof, a pickup, normally inactive tape moving means for moving tape past said pickup for playing, a tape take-up drive, a tape playing switch coacting with said solenoid clutch to effect movement of said shaft to said tape playing position, cam means on said shaft coacting with said tape moving means and with said take-up drive to effect operation thereof upon movement of said shaft to said tape playing position, a tape rewind control connected for operation by tape moving past said pickup and coacting with said solenoid clutch to effect movement of said shaft through said rewind position thereof to said normal position thereof upon completion of playing of a recording on tape moving past said pickup, a tape rewind drive, cam means on said shaft coacting with said tape rewind drive to put the latter into operation upon movement of said cam shaft to said rewind position thereof, brake means coacting with said take-up drive and said rewind drive to normally restrain said drives against movement, cam means on said shaft coacting with said brake means to release the latter upon movement of said shaft to either said tape playing position or said tape rewind position thereof, tape rewind continuing means coacting with said brake means and with said rewind drive to continue release of said brake means and operation of said rewind drive after movement of said shaft through said rewind position thereof to said normal position thereof, first and second tape rewind control elements, first and second transmission means operated by said rewind drive and coacting with said first and second rewind control elements to displace the latter at radically different rates of speed in directions having senses which correspond respectively with the sense of movement of said rewind drive, and rewind stopping means coacting with said first and second rewind control elements and connecting with said rewind continuing means to terminate effective operation of said rewind drive and to effect reapplication of said brake means automatically upon return of said rewind drive to its normal starting condition.

8. In a jukebox, an automatic tape deck comprising, in combination, a tape take-up drive, a tape rewind drive, a tape playing pickup, means for guiding tape past said pickup for playing, said rewind drive including an energizing clutch therefor, brake means coacting with said rewind drive to normally hold the latter against effective movement, a control cam shaft having a tape rewind position and a normal position, control means for moving said shaft through said rewind position to said normal position, rewind cam means on said shaft, brake release means coacting with said rewind cam means and said brake means to release the latter as an incident to movement of said cam means through said rewind position thereof, rewind clutch control means coacting with said rewind cam means and with said rewind drive clutch to engage the clutch upon movement of said cam shaft through said rewind position thereof, solenoid actuated holding means coacting with said brake release means and with said clutch control means to hold the brake release means and the clutch control means in positions for continuing release of said brake means and continuing engagement of said clutch after movement of said cam shaft beyond the rewind position thereof, and rewind termination switch means operated by said rewind drive and connected with said solenoid holding means to terminate the effective holding action thereof automatically as an incident to return of said rewind drive to its normal starting condition.

9. For use in a jukebox, a tape deck comprising, in combination, a tape playing pickup, means for guiding tape past said pickup for playing, a tape rewind drive including a reel rotating element, a rewind termination switch interconnected with said rewind drive to effect an abrupt termination of a tape rewinding operation thereof, two rotary switch operating cam disks mounted for rotation in concentric relation to each other, a first speed reducing transmission interconnecting said reel rotating element of said rewind drive with a first one of said cam disks to rotate the latter at a greatly reduced speed which turns said first cam disk through less than one complete revolution during a normal tape rewinding operation of said rewind drive, a second speed reducing transmission connecting said reel rotating element with a second one of said cam disks to rotate the latter at a reduced speed which greatly exceeds the speed of said first cam disk, each of said cam disks defining a switch operating indentation in the periphery thereof, and a switch operating cam following means coacting with said rewind termination switch and engaging the peripheries of both said cam disks to effect operation of said switch only when both said cam indentations are rotated into alignment with said cam following means.

10. In a jukebox, an automatic tape deck for playing multiple channel recorded tape, comprising, in combination, a tape playing pickup, a rotary tape moving element for moving tape past said pickup for playing, a retractable platen element coacting with said rotary tape moving element to hold tape thereagainst for movement thereby, a retractable backup head coacting with said pickup to hold tape thereagainst for playing, a tape take-up drive including a normally disabled friction transmission therein, a rotary cam shaft, control means for displacing said shaft to a tape playing position, cam means on said shaft coacting with said platen element and with said tape backup head to effect advancement thereof into tape pressing relation to said tape moving element and said pickup upon movement of said shaft to its tape playing position, means connecting said cam means with said friction transmission to effect operation of the latter to energize said take-up drive upon movement of said cam shaft to its said tape playing position, a tape rewind drive, means for moving said cam shaft to a rewind position, cam means on said shaft coacting with said rewind drive for effecting operation thereof upon movement of said shaft to said rewind position, and said first mentioned cam means being shaped to effect retraction of said platen element and said backup head from the operative positions thereof upon movement of said cam shaft to said rewind position thereof.

11. For use in a jukebox or the like, an automatic tape deck for playing multiple channel tapes, comprising, in combination, means for guiding a multiple channel tape along a predetermined path for playing, a tape take-up drive, a tape rewind drive, a tape playing pickup having a normal position alongside said path, a ratchet wheel interconnected with said pickup to index the pickup laterally with respect to said path from the normal position of the pickup for alignment with selected channels of tape extending through said path, an indexing pawl coacting with said ratchet wheel to effect incremental rotation of the latter, an indexing solenoid coacting with said indexing pawl to intermittently operate the latter, a holding pawl coacting with said ratchet wheel to hold the latter against reverse movement, a pickup return pawl coacting with said holding pawl to disengage the latter from said ratchet wheel to effect return movement of said pickup to its normal position, a pickup return solenoid coacting with said return pawl to actuate the latter, a latch coacting with said return pawl to latch the latter in pickup returning position, means interconnecting said indexing pawl with said latch to release said return pawl for reactivating said holding pawl, and means for operating said tape take-up drive and said rewind drive in timed relation to each other.

12. An automatic tape deck comprising, in combination, a tape take-up drive, a tape rewind drive, a tape playing pickup, brake means coacting with said rewind drive to hold the latter against effective movement, cam means having a tape rewind position and a normal position, control means for moving said cam means through said rewind position to said normal position, brake control means coacting with said cam means and with said brake means to effect release of the latter as an incident to movement of said cam means through said rewind position thereof, electrically controlled holding means coacting with said brake control means to continue release of said brake means after movement of said cam means beyond said rewind position thereof, and rewind termination switch means operated by said rewind drive and connected with said holding means to effect application of said brake means automatically as an incident to return of said rewind drive to its normal starting condition.

13. A tape deck comprising, in combination, a tape playing pickup, means for guiding tape past said pickup for playing, a tape rewind drive including a reel rotating element, a rewind termination control interconnected with said rewind drive to effect an abrupt termination of a tape rewinding operation thereof, two rotary cams, a first speed reducing transmission interconnecting said reel rotating element of said rewind drive with a first one of said cams to rotate the latter at a greatly reduced speed which turns said first cam through less than one complete revolution during a normal tape rewinding operation of said rewind drive, a second speed reducing transmission connecting said rewind reel rotating element with a second one of said cams to rotate the latter at a speed which greatly exceeds the speed of said first cam, each of said cams including a critical control portion, and cam follower means engaging each of said cams and coacting with said rewind termination control to effect operation of said control automatically as an incident to movement of said critical control portions of both said cams into registration with said cam follower means.

14. An automatic tape deck comprising, in combination, a tape playing pickup, a tape driving element for moving tape past said pickup for playing, a retractable platen element coacting with said tape driving element to hold tape thereagainst for movement thereby, a retractable backup head coacting with said pickup to hold tape thereagainst for playing, a normally inactive tape take-up drive, a movable cam carrier, control means for displacing said carrier to a tape playing position, cam means on said carrier coacting with said platen element and with said tape backup head to effect advancement thereof toward said tape moving element and said pickup upon movement of said cam carrier to its tape playing position, means connecting said cam means with said take-up drive to effect operation of the latter upon movement of said cam carrier to its tape playing position, a tape rewind drive means for moving said cam carrier to a rewind position, cam means on said carrier for effecting operation of said rewind drive upon movement of said carrier to said rewind position thereof, and said first mentioned cam means being shaped to effect retraction of said platen element and said backup head from the operative positions thereof upon movement of said cam carrier to said rewind position thereof.

15. An automatic tape deck for playing multiple channel tape, comprising, in combination, means for guiding a multiple channel tape along a predetermined path for playing, a tape take-up drive, a tape rewind drive, a tape playing pickup biased to a normal position alongside said path, a ratchet interconnected with said pickup to index the pickup laterally with respect to said path from a normal position of the pickup to any of a plurality of positions differentially spaced laterally with respect to said path for playing alinement with corresponding channels of a tape extending through said path, an indexing solenoid coacting with said ratchet to operate the latter, means for holding said pickup in the indexed position thereof, a pickup return solenoid coacting with said holding means to release the latter thereby effecting return movement of the pickup to the normal position thereof, and means for operating said tape take-up drive and said rewind drive in timed relation to each other.

16. An automatic tape deck comprising, in combination, a tape rewind drive, a pickup, means for guiding tape past said pickup, clutch means for energizing said rewind drive, normally engaged brake means coacting with said rewind drive to hold the latter against movement, rewind drive control means including means for engaging said clutch and means for releasing said brake means for braking said rewind drive, electrical holding means coacting with said rewind drive clutch and with said brake means to hold said clutch in engaged condition and to hold said brakes in released condition after engagement of the clutch and release of the brake by said rewind drive control means, a tape rewind stopping switch connected to control energization of said electrical holding means, first and second control elements for said stopping switch, first transmission means connecting said rewind drive to said first switch control element to effect a relatively low degree of displacement of said first control element upon movement of said rewind drive, second transmission means connecting said rewind drive to said second switch operating element to effect a relatively high degree of displacement of the latter upon operation of said rewind drive, and control means for said rewind stopping switch coacting with both said switch control elements to effect operation of said switch to operate said holding means for effecting application of said brake means upon movement of both said control elements to normal positions thereof.

17. An automatic tape playing deck comprising, in combination; a rotary control shaft having a normal position, a tape playing position, and a tape rewind position; a pickup, normally inactive tape moving means for moving tape past said pickup for playing, a tape take-up drive, means for moving said shaft to said tape playing position, cam means on said shaft coacting with said tape moving means and with said take-up drive to effect operation thereof upon movement of said shaft to said tape playing position, a frequency responsive control coacting with said pickup and interconnected with said shaft to effect movement thereof through said rewind position to said normal position upon sensing of a predetermined recorded frequency by said pickup, a tape rewind drive, cam means on said shaft coacting with said tape rewind drive to put the latter into operation upon movement of said shaft through said rewind position thereof, brake means coacting with said take-up drive and said rewind drive to normally restrain said drives against movement, and cam means on said shaft coacting with said brake means to release the latter upon movement of said shaft to either said tape playing position or said tape rewind position thereof.

18. For playing a multiple channel recorded tape automatically in a jukebox or the like, a tape deck comprising, in combination, a tape rewind drive including a rewind reel rotating element, a tape take-up drive, a pickup, means for guiding tape past said pickup for playing, control means for effecting operation of said take-up drive for playing of tape through said pickup, control means including a rewind switch coacting with said rewind drive to effect operation thereof, a frequency responsive switch operator coacting with said pickup and interconnected with said rewind switch to actuate the latter to effect operation of said rewind drive in response to sensing of a predetermined recorded frequency by said pickup, and a rewind termination control controlled by said rewind reel rotating element and coacting with said rewind drive to terminate operation of said reel rotating element upon movement of the reel rotating to a predetermined rotary condition.

19. An automatic tape deck comprising, in combination, a tape playing pickup, tape driving means for moving tape past said pickup for playing, tape driving control means coacting with said tape driving means to control the tape driving action of the latter, a normally inactive tape take-up drive, a movable cam operator, cam means controlled by said cam operator, actuating means for displacing said cam operator to a tape playing position, cam follower means operated by said cam means and coacting with said take-up drive and with said tape driving control means to activate said tape driving means and with said take-up drive to effect movement of tape past said pickup for playing upon movement of said cam operator to said tape playing position thereof, a high speed tape rewind drive, means for effecting movement of said cam operator to a rewind position, second cam means controlled by said cam operator and coacting with said rewind drive for effecting operation thereof to respool tape upon movement of said cam operator to said rewind position thereof, and said first mentioned cam means being shaped to effect deactivation of said tape driving means and said tape take-up drive upon movement of said cam operator to said rewind position thereof.

20. In a tape deck, the combination of a tape take-up drive, a tape rewind drive, tape playing pickup, means for guiding tape past the pickup for playing, brake means coacting with said rewind drive to hold the latter against movement, cam control means having a plurality of positions including a rewind position, actuating means for moving said control means to said rewind position thereof, rewind cam means controlled by said cam control means, brake control means controlled by said rewind cam means and coacting with said brake means to release the latter as an incident to movement of said cam control means to said rewind position thereof, rewind drive control means controlled by said rewind cam means and coacting with said rewind drive to activate the latter for respooling tape as an incident to movement of said cam control means to said rewind position thereof, and rewind termination means operated by said rewind drive and coacting with said rewind drive to terminate operation of the latter as an incident to return of said rewind drive to its normal starting condition.

21. For use in playing a multiple channel tape, a tape deck comprising, in combination, a pickup, means for positioning tape in a path extending alongside said pickup for playing, tape driving means for moving tape through said path past said pickup for playing, said pickup having a predetermined normal position, electrically controlled channel selecting means coacting with said pickup for moving the latter from said normal position thereof laterally with respect to said path for alinement with selected recording channels of tape disposed in said path, said channel selecting means including electrically responsive means for returning said pickup to said normal position thereof, a normally inactive tape take-up drive for winding tape moved past said pickup, a high speed tape rewind drive for respooling tape previously moved past said pickup for playing, brake means coacting with both said take-up drive and said rewind drive to normally hold both said drives against rotation; and common control means coacting with said brake means, said tape driving means, take-up drive and said rewind drive to effect operation thereof in coordinated relation to each other to move tape past said pickup for playing and to effect high speed respooling of tape subsequent to playing movement of the tape past said pickup.

22. In an automatic tape deck, the combination of a pickup, a take-up reel drive element, a rewind reel drive element having a normal condition, brake means for said respective drive elements, spring means coacting with said brake means to urge the brake means for both drive elements into an applied condition, means for releasing said brake means from both said drive elements for a tape rewinding operation, electrically controlled holding means for holding said brake means in released condition against the action of said spring means, a control switch for said electrically controlled holding means, precision switch operating means interconnected with said rewind reel drive element and coacting with said switch to effect release of said holding means for application of said brake means by said spring means to both said drive elements as an incident to return of said rewind drive element to its normal condition.

23. In an automatic tape deck, the combination of a take-up reel drive element, a rewind reel drive element having a normal starting condition, transmission means for driving said take-up reel drive element at a relatively low effective speed, transmission means for driving said rewind reel drive element at a relatively high effective speed, brake means coacting with said respective reel drive elements to hold the latter against movement, means for effecting release of said brake means to free both said reel driving elements for a tape rewinding operation, means urging said brake means to an applied condition, holding means for holding said brake means in released condition for a rewinding operation, and a precision control interconnected with said rewind drive element and coacting with said holding means to release the latter for effecting a reapplication of said brake means to both said reel driving elements simultaneously upon return movement of said rewind reel drive element to the normal starting position thereof.

24. In an automatic tape deck, the combination of means for directing a multiple tape channel along a predetermined path for playing, a tape playing pickup positioned adjacent said path, electrically controlled means for moving said pickup laterally with respect to said path and reversibly in either of two lateral directions to effect alinement of the pickup with selected channels of tape in said path, a rotary tape take-up reel drive element, a rotary rewind reel drive element, brake means for said respective reel drive elements, a normally deactivated transmission for rotating said take-up reel drive element, transmission control means for controllably activating said transmission to power said take-up reel drive element, brake control means for releasing said brake means from both said reel drive elements, common actuating means for said transmission control means and said brake control means, and said brake control means and said transmission control means being physically related to said common actuating means to effect as an incident to operation of said transmission control means to deactivate said transmission a synchronized operation of said brake control means to apply said brake means before said transmission is deactivated.

25. In a tape deck for automatically playing a multiple channel tape, the combination of a pickup, a tape drive for moving tape past said pickup for playing, a take-up reel drive, a rewind reel drive, a common power transmission interconnected with all three of said drives to energize all three drives, three controls for deactivating said respective drives, brake means for said reel drives, brake control means for controlling said brake means, common control means coacting with the three drive controls and with said brake control means for effecting coordinated operation of the three drives and said brake means to effect movement of tape past said pickup for playing and respooling of tape after playing thereof, and control clutch means interconnecting said transmission with said common control means to effect controlled displacement of the latter to different positions thereof for controlling the operation of said drives and said brake means.

References Cited in the file of this patent

UNITED STATES PATENTS

| | | |
|---|---|---|
| 2,116,314 | Jenkins | May 3, 1938 |
| 2,328,539 | Greenleaf | Sept. 7, 1943 |
| 2,513,423 | Owens | July 4, 1950 |
| 2,821,576 | Gaubert | Jan. 28, 1958 |